US009476800B2

(12) United States Patent
Olesky et al.

(10) Patent No.: US 9,476,800 B2
(45) Date of Patent: Oct. 25, 2016

(54) WHEEL MEASUREMENT APPARATUS

(75) Inventors: Stanley J. Olesky, Canal Fulton, OH (US); Vladimir Roth, Akron, OH (US); John L. Turner, Tucson, AZ (US)

(73) Assignee: Bridgestone Americas Tire Operations, LLC, Nashville, TN (US)

( * ) Notice: Subject to any disclaimer, the term of this patent is extended or adjusted under 35 U.S.C. 154(b) by 325 days.

(21) Appl. No.: 14/127,394

(22) PCT Filed: Jun. 5, 2012

(86) PCT No.: PCT/US2012/040894
§ 371 (c)(1),
(2), (4) Date: Mar. 27, 2014

(87) PCT Pub. No.: WO2012/177385
PCT Pub. Date: Dec. 27, 2012

(65) Prior Publication Data
US 2014/0245623 A1  Sep. 4, 2014

Related U.S. Application Data

(60) Provisional application No. 61/500,748, filed on Jun. 24, 2011.

(51) Int. Cl.
*G01B 5/255* (2006.01)
*G01M 17/013* (2006.01)

(52) U.S. Cl.
CPC ............ *G01M 17/013* (2013.01); *G01B 5/255* (2013.01); *G01B 2210/16* (2013.01)

(58) Field of Classification Search
CPC .................. G01B 2210/16; G01M 17/013
USPC ........... 33/203, 203.12, 203.15, 203.18, 228, 33/286, 293, 600
See application file for complete search history.

(56) References Cited

U.S. PATENT DOCUMENTS 1,209,345 A * 12/1916 Smith .................... G01B 5/255
33/203.15
1,601,261 A * 9/1926 Prather ................. G01B 5/255
33/335
(Continued)

FOREIGN PATENT DOCUMENTS

JP    2817345        8/1998
JP    2817345 B2     8/1998
(Continued)

OTHER PUBLICATIONS

Ahn, Jacyul, International Search Report with Written Opinion from PCT/US2012/040894, 14 pp. (Jan. 31, 2013).
(Continued)

*Primary Examiner* — R. A. Smith
*Assistant Examiner* — Tania Courson
(74) *Attorney, Agent, or Firm* — Shaun J. Fox; Bryan Jaketic (57) ABSTRACT

An apparatus is mounted to a vehicle for obtaining a camber angle measurement. The apparatus includes a lower elongated member, a vertical elongated member, and an upper elongated member. The apparatus further includes a lower coupling that connects the lower elongated member to the vertical elongated member. The lower coupling allows the vertical elongated member to rotate about an axis, and prevents the lower elongated member from rotating about its longitudinal axis. The apparatus also includes an upper coupling that connects the vertical elongated member to the upper elongated member. A lower connector is connected to the lower elongated member, and is configured to be connected to a wheel of a vehicle. An upper connector is connected to the upper elongated member, and is configured to be connected to the vehicle.

20 Claims, 4 Drawing Sheets

(56) References Cited

U.S. PATENT DOCUMENTS

| | | | | |
|---|---|---|---|---|
| 1,974,006 A * | 9/1934 | Bennett | | G01B 5/255 33/203 |
| 4,271,599 A * | 6/1981 | Pavitt | | G01B 5/255 33/203.18 |
| 4,569,140 A * | 2/1986 | Hobson | | G01B 5/255 33/203.18 |
| 4,574,490 A * | 3/1986 | Curchod | | G01B 7/144 33/203.18 |
| 4,615,618 A * | 10/1986 | Bailey | | G01B 11/2755 33/203.17 |
| 4,967,480 A * | 11/1990 | DeLuca | | G01B 5/255 33/203.18 |
| 5,018,853 A | 5/1991 | Hechel et al. | | |
| 5,368,260 A | 11/1994 | Izbinsky et al. | | |
| 5,452,606 A * | 9/1995 | Castelnuovo | | G01B 5/255 33/203 |
| 5,481,907 A | 1/1996 | Chasco et al. | | |
| 5,489,979 A | 2/1996 | Corghi | | |
| 5,561,244 A | 10/1996 | Olesky et al. | | |
| 5,617,642 A * | 4/1997 | Marios | | B25H 7/02 33/452 |
| 5,842,281 A * | 12/1998 | Mieling | | G01B 5/255 33/203.18 |
| 5,969,246 A | 10/1999 | Jackson et al. | | |
| 6,446,501 B1 | 9/2002 | Domeck et al. | | |
| 6,483,577 B2 | 11/2002 | Stieff | | |
| 6,526,665 B2 * | 3/2003 | Jackson | | G01B 5/255 33/203.18 |
| 6,532,811 B2 | 3/2003 | Turner et al. | | |
| 6,545,750 B2 | 4/2003 | Roth et al. | | |
| 6,584,835 B2 | 7/2003 | Jenniges et al. | | |
| 6,799,376 B1 * | 10/2004 | Voeller | | G01B 5/255 33/203 |
| 6,813,938 B2 | 11/2004 | Schwendemann | | |
| 7,073,267 B2 * | 7/2006 | Butler | | G01B 5/0025 33/203 |
| 7,228,732 B2 | 6/2007 | Turner et al. | | |
| 7,331,211 B2 * | 2/2008 | Harrill | | B60G 3/26 33/288 |
| 7,398,980 B2 | 7/2008 | Capers, Jr. et al. | | |
| 7,610,685 B2 * | 11/2009 | Percival | | G01B 5/0025 33/203 |
| 2003/0030792 A1 * | 2/2003 | Braghiroli | | G01D 5/26 356/139.09 |
| 2006/0185180 A1 * | 8/2006 | MacKelvie | | G01B 5/255 33/203.18 |
| 2008/0101053 A1 | 5/2008 | Hoffman et al. | | |
| 2011/0088489 A1 | 4/2011 | Yamamoto | | |

FOREIGN PATENT DOCUMENTS

| | | |
|---|---|---|
| JP | 2007276752 A | 10/2007 |
| JP | 2010-145257 | 7/2010 |
| JP | 2010145257 A | 7/2010 |
| KR | 20070114678 A | 12/2007 |

OTHER PUBLICATIONS

International Preliminary Report on Patentability; International Serial No. PCT/US2012/040894; Authorized Officer Moon, Kihwan; Jan. 9, 2014.

* cited by examiner

WHEEL MEASUREMENT APPARATUS

FIELD OF INVENTION

This disclosure relates to an apparatus for determining the camber of vehicle tires. More particularly, this disclosure relates to such an apparatus that measures the dynamic camber on a vehicle tire in an operating environment.

BACKGROUND

Various equipment has been developed for measuring camber on a tire. Camber is one of the factors tested to determine tire wear and ride characteristics. Various devices, some of which use lasers, have been used for alignment and for measuring both camber and caster in wheel mechanisms. One known device is attached to a moving vehicle in order to obtain the dynamic angles of camber that the tire experiences as it moves along an actual road surface on a particular moving vehicle.

Some known devices include a member attached to the wheel of a car, and a sensor pointing downwards towards a driving surface. When a wheel steering axis is tilted from the axis normal to the road, a steer change can also induce a small rotation in the member about the wheel spindle axis. Such a rotation would alter the direction of the sensor, thereby altering the distance reading of the sensor.

SUMMARY OF THE INVENTION

In one embodiment, an apparatus is used for measuring a camber angle of a wheel on a vehicle. The apparatus includes a lower elongated member having a longitudinal axis, a vertical elongated member having a longitudinal axis, and an upper elongated member having a longitudinal axis. A lower coupling connects the lower elongated member to the vertical elongated member. The lower coupling permits the lower elongated member to translate along its longitudinal axis, and permits the vertical elongated member to rotate about at least one axis. An upper coupling connects the vertical elongated member to the upper elongated member. The upper coupling permits the vertical elongated member to rotate about at least one axis. A lower connector connects the lower elongated member to the wheel. An upper connector connects the upper elongated member to the vehicle.

In another embodiment, an apparatus is mounted to a vehicle for obtaining a camber angle measurement. The apparatus includes a lower elongated member, a vertical elongated member, and an upper elongated member. The apparatus further includes a lower coupling that connects the lower elongated member to the vertical elongated member. The lower coupling allows the vertical elongated member to rotate about an axis, and prevents the lower elongated member from rotating about its longitudinal axis. The apparatus also includes an upper coupling that connects the vertical elongated member to the upper elongated member. A lower connector is connected to the lower elongated member, and is configured to be connected to a wheel of a vehicle. An upper connector is connected to the upper elongated member, and is configured to be connected to the vehicle.

In an additional embodiment, an apparatus provides a stable platform for taking a measurement of a vehicle. The apparatus has three substantially orthogonal axes, including an X axis defining an X direction, a Y axis defining a Y direction, and a Z axis defining a Z direction. The apparatus includes an upper elongated member, a vertical elongated member, and a lower elongated member. The apparatus also includes means for accommodating rotation of the vertical elongated member about the X axis, means for accommodating translation of the lower elongated member in the Y direction, and means for accommodating rotation of the vertical elongated member about the Z axis. First means are used for securing the apparatus to a body of a vehicle, and second means are used for securing the apparatus to a wheel of the vehicle.

BRIEF DESCRIPTION OF THE DRAWINGS

In the accompanying drawings, structures are illustrated that, together with the detailed description provided below, describe exemplary embodiments of the claimed invention. Like elements are identified with the same reference numerals. It should be understood that elements shown as a single component may be replaced with multiple components, and elements shown as multiple components may be replaced with a single component. The drawings are not to scale and the proportion of certain elements may be exaggerated for the purpose of illustration.

DETAILED DESCRIPTION

The following includes definitions of selected terms employed herein. The definitions include various examples and/or forms of components that fall within the scope of a term and that may be used for implementation. The examples are not intended to be limiting. Both singular and plural forms of terms may be within the definitions.

"X Direction" refers to a direction parallel to a wheel's direction of travel.

"X Axis" describes the axis of any movement occurring in the X direction.

"Y Direction" refers to a direction that is parallel to the axis of rotation of a tire.

"Y Axis" describes the axis of any movement occurring in the Y direction.

"Z Direction" refers to a direction that is perpendicular to both the X and Y Directions.

"Z Axis" describes the axis of any movement occurring in the Z direction.

Figure 1:
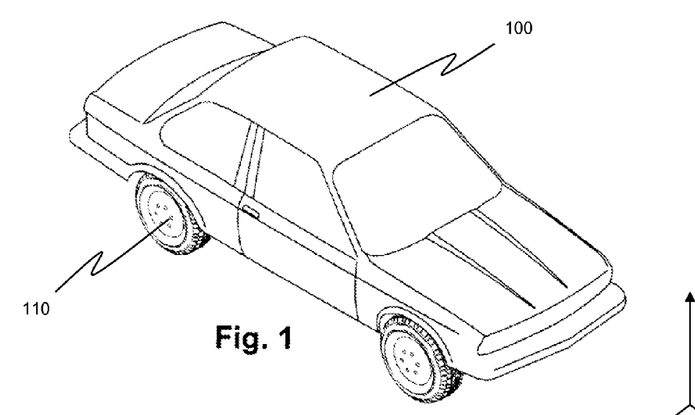
FIG. 1 is a perspective view of an exemplary test vehicle.

FIG. 1 illustrates a perspective view of an exemplary test vehicle 100. Vehicle 100 sits on tires 110 and is configured to receive a measurement apparatus (not shown) according to this disclosure. The vehicle 100 may be a standard manufactured vehicle, and need not be custom made or modified. FIG. 1 depicts vehicle 100 as a passenger automobile. In alternative embodiments, vehicle 100 may be any type of vehicle including, but not limited to, a bus, truck, van, sport-utility vehicle, sports car, or a racecar.

Figure 2:
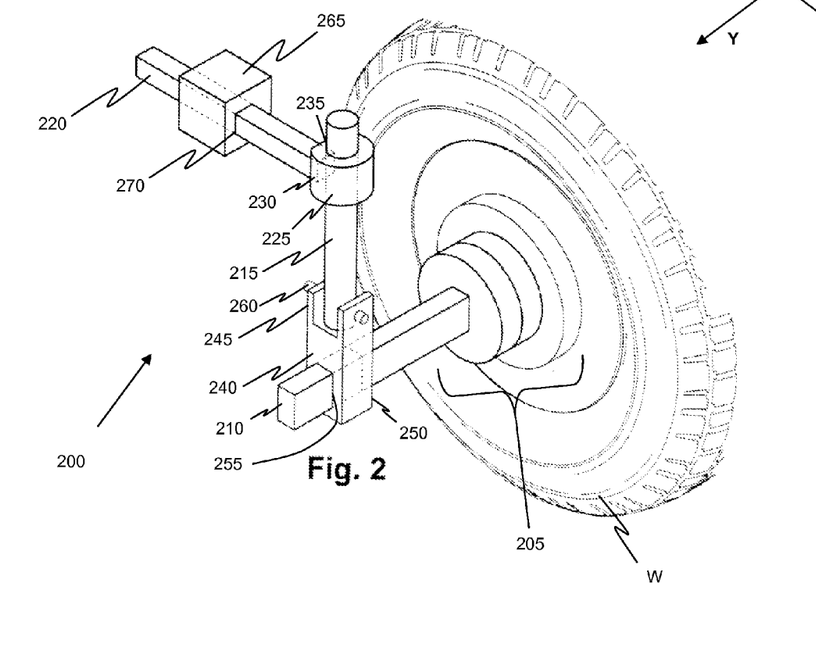
FIG. 2 is a perspective view of one embodiment of a measurement apparatus.

FIG. 2 illustrates a perspective view of a measurement apparatus 200. The measurement apparatus 200 is attached to a wheel W of a vehicle. The measurement apparatus 200 includes a lower elongated member 210, a vertical elongated member 215, and an upper elongated member 220. The lower elongated member 210, vertical elongated member 215, and upper elongated member 220 all have longitudinal axes that are approximately orthogonal to each other, but change relative orientations with vehicle steering. Here, the lower elongated member 210 extends in the Y direction, the vertical member 215 extends in the Z direction, and the upper elongated member 220 extends in the X direction. However, each of the lower elongated member 210, vertical elongated member 215, and upper elongated member 220 may rotate or translate such that they do not retain a fixed relative orientation.

The lower elongated member 210, vertical elongated member 215, and upper elongated member 220 all have a fixed length. However, in alternative embodiments, at least one of the lower elongated member 210, vertical elongated member 215, and upper elongated member 220 is configured to expand telescopically.

An upper coupling 225 joins the upper elongated member 220 to the vertical elongated member 215. The upper coupling 225 is rigidly connected to one end of the upper elongated member 220. In the illustrated embodiment, the upper coupling 225 has a first aperture 230 that receives an end of the upper elongated member 220. The end of the upper elongated member 220 is fixed in place via a press fit or with the use of welding, adhesive, tape, a screw, a joint, or other fasteners. The upper elongated member 220 has a rectangular cross section and the first aperture 230 in the upper coupling 225 has a corresponding rectangular cross section. Accordingly, the upper elongated member 220 is restricted from rotating about its longitudinal axis. It should be understood that other geometric cross sections may be employed.

In an alternative embodiment (not shown), the upper elongated member has a circular cross section and the first aperture 230 of the upper coupling 225 has a corresponding circular cross section, allowing the upper elongated member to rotate about its longitudinal axis. In another alternative embodiment (not shown), the upper elongated member and the upper coupling 225 are a single, unitary component.

The upper coupling 225 also includes a second aperture 235 that receives the vertical elongated member 215, and allows the vertical elongated member 215 to translate upward and downward in the Z direction relative to the upper coupling 225. In other words, upper coupling 225 and vertical elongated member 215 slide vis-à-vis each other through a range of motion. As shown, the second aperture 235 and the cross section of the vertical elongated member 215 are circular. Because the second aperture 235 extends entirely through the upper coupling 225, the vertical elongated member 215 may translate through the upper coupling 225 through a range of motion. The circular shape also allows the vertical elongated member 215 to rotate about its longitudinal axis (i.e., the Z axis). Allowing the vertical elongated member 215 to translate and rotate helps prevent the lower elongated member 210 from rotating about its longitudinal axis. It should be understood that lubricant or bearings may be utilized to provide for smoother translation or rotation.

In an alternative embodiment (not shown), the upper coupling 225 rests on top of the vertical elongated member 215 and does not allow the vertical elongated member 215 to pass through it. In this embodiment, the vertical elongated member 215 is free to rotate about its longitudinal axis, but its ability to translate is limited to the depth of the second aperture 235. In another alternative embodiment (not shown), the vertical elongated member 215 can translate when it is configured to expand telescopically. The second aperture 235 may be secured to an end of the vertical elongated member 215 while allowing it to expand telescopically. In an additional alternative embodiment, the upper coupling 225, regardless of configuration, is an integrated component of the upper elongated member 220.

A lower coupling 240 joins the lower elongated member 210 to the vertical elongated member 215. The lower coupling 240 contains an upper section 245 and a lower section 250. Lower section 250 includes a third aperture 255 that receives the lower elongated member 210 and permits the lower coupling 240 to translate in the Y direction. Thus, third aperture 255 permits the lower coupling 240 to slide through a range of motion with respect to the lower elongated member 210. It should be understood that lubricant or bearings may be utilized to provide for smoother translation in both couplings 225 and 240.

As shown, the third aperture 255 and the lower elongated member 210 have rectangular cross sections. The rectangular cross sections help prevent the lower elongated member 210 from rotating about its longitudinal axis, thus providing a stable measurement platform. In alternative embodiments, the third aperture 255 and the lower elongated member 210 have polygonal or non-circular cross sections in order to prevent the lower elongated member 210 from rotating about its longitudinal axis.

The upper section 245 includes a slot configured to receive an end of the vertical elongated member 215. A pin 260 runs through the upper section 245 and the vertical elongated member 215, effectively joining the lower elongated member 210 and the vertical elongated member 215. The lower coupling 240 and pin 260 allow the vertical elongated member 215 to rotate about the pin's longitudinal axis. This permits the vertical elongated member 215 to rotate about an X axis. It should be understood that lubricant or bearings may be utilized to provide for smoother rotation. In alternative embodiments, the pin 260 is replaced by a hinge joint, ball joint, or heim joint, allowing the vertical elongated member 215 to rotate about at least the Z axis.

The pin 260 restricts rotation of the bottom of the vertical elongated member 215 about the Z axis, relative to arm 210 and coupling 250. However, the top of the vertical elongated member 215 is free to rotate about the Z axis, relative to coupling 225, as described above. Therefore, a relative twisting motion about the Z axis may occur between the vertical elongated member 215 and the coupling 225. In an alternative embodiment (not shown), the upper section of the lower coupling may include slots that receive the pin, and allow the bottom of the vertical elongated member to rotate about the Z axis.

An upper receiver 265 receives the upper elongated member 220 through a fourth aperture 270. The fourth aperture 270 permits the upper elongated member 220 to translate forward and rearward in the X direction relative to the upper receiver 265. In other words, upper elongated member 220 slides through a range of motion with respect to the upper receiver 265. It should be understood that lubricant or bearings may be utilized to provide for smoother translation.

As shown, the fourth aperture 270 and the upper elongated member 220 have square cross sections. The square cross sections help prevent the upper elongated member 220 from rotating about its longitudinal axis. In alternative embodiments the fourth aperture 270 and the upper elongated member 220 have polygonal or non-circular cross sections to prevent the upper elongated member 220 from rotating about its longitudinal axis.

In an alternative embodiment, the upper receiver 265 does not allow the upper elongated member 220 to pass through it. In other words, the upper elongated member 220 does not translate through the upper receiver 265 in this particular embodiment. Instead, the upper elongated member 220 is secured to the upper receiver 265. Although the upper elongated member 220 does not translate through the receiver 265 in this particular embodiment, the upper elongated member 220 allows movement in the X direction if it is configured to expand telescopically. In either embodiment, an upper connector (not shown) connects the upper receiver to the vehicle. In these embodiments the upper connector is selected from the group consisting of a screw, a joint, a suction cup, glue, tape, solder, a magnetic connection, and a weld.

The measurement apparatus 200 is connected to wheel W by a lower connector 205. In one embodiment, lower connector 205 connects the lower elongated member to the wheel W while inhibiting the rotation of the lower elongated member about its longitudinal axis. As shown, lower connector 205 is a ring bearing having two concentric disks connected to the hub of wheel W. In alternative embodiments, the lower connector 205 may be any mount that provides a non-rotating option for connection to a wheel, such as a four-point ring bearing, a thrust roller ring bearing, or a multiple row ring bearing. Such bearings and mounts may be commercially available through companies such as Corrsys-Datron.

As shown, the measurement apparatus 200 has the ability to translate in the X, Y, and Z directions relative to the vehicle body. Additionally, the measurement apparatus also has the ability to rotate about the X axis and the Z axis as necessary for steering and camber angle changes of the wheel.

In the above-described embodiment, rotation of the lower elongated member 210 about the Y axis is restricted during steering angle changes, even when the steer axis of the wheel is not normal to the road. Accordingly, if a sensor were mounted to the measurement apparatus 200 in a downward facing position, it would not be rotated about the Y axis out of the downward facing position.

Figure 3:
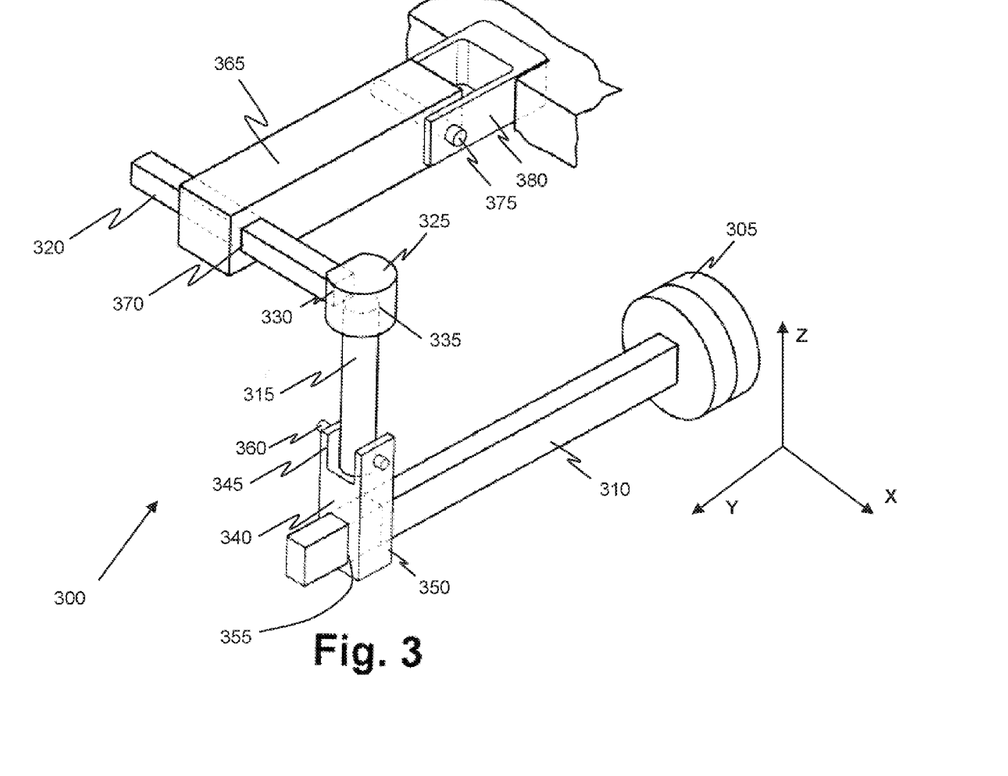
FIG. 3 is a perspective view of an alternative embodiment of a measurement apparatus.

FIG. 3 illustrates a perspective view of an alternative embodiment of a measurement apparatus 300. The measurement apparatus 300 includes a lower elongated member 310, a vertical elongated member 315, and an upper elongated member 320. The lower elongated member 310, vertical elongated member 315, and upper elongated member 320 all have longitudinal axes that are generally orthogonal to each other. Here, the lower elongated member 310 extends in the Y direction, the vertical member 315 extends in the Z direction, and the upper elongated member 320 extends in the X direction. However, each of the lower elongated member 310, vertical elongated member 315, and upper elongated member 320 may rotate or translate such that they are no longer orthogonal to each other.

The lower elongated member 310, vertical elongated member 315, and upper elongated member 320 all have a fixed length. However, in alternative embodiments, at least one of the lower elongated member 310, vertical elongated member 315, and upper elongated member 320 is configured to expand telescopically.

An upper coupling 325 joins the upper elongated member 320 to the vertical elongated member 315. The upper coupling 325 is rigidly connected to one end of the upper elongated member 320. In the illustrated embodiment, the upper coupling 325 has a first aperture 330 that receives an end of the upper elongated member 320. The end of the upper elongated member 320 is fixed in place via a press fit or with the use of welding, adhesive, tape, a screw, or joint, or other fasteners. The upper elongated member 320 has a rectangular cross section and the first aperture 330 in the upper coupling 325 has a corresponding rectangular cross section. Accordingly, the upper elongated member 320 is restricted from rotating about its longitudinal axis. It should be understood that other geometric cross sections may be employed.

In an alternative embodiment (not shown), the upper elongated member 320 has a circular cross section and the first aperture 330 of the upper coupling 325 has a corresponding circular cross section, allowing the upper elongated member 320 to rotate about its longitudinal axis (i.e., the X axis). In another alternative embodiment (not shown), the upper elongated member 320 and the upper coupling 325 are a single, unitary component.

The upper coupling 325 also includes a second aperture 335 that receives the vertical elongated member 315. As shown, the upper coupling 325 rests on top of the vertical elongated member 315 and does not allow the vertical elongated member 315 to pass through it. In this embodiment, the vertical elongated member 315 and the second aperture 335 both have circular cross sections. As shown, no interference fit or press fit exists between vertical elongated member 315 and the second aperture 335. Therefore, the vertical elongated member 315 is free to rotate about its longitudinal axis (i.e., the Z axis). Similarly, its ability to translate is limited to the depth of the second aperture 335. It should be understood that lubricant or bearings may be utilized to provide for smoother rotation.

In an alternative embodiment (not shown), the second aperture 335 permits the vertical elongated member 315 to pass through the upper coupling 325, thus permitting the vertical elongated member 315 to translate upward and downward in the Z direction relation to the upper coupling 325. In another alternative embodiment (not shown), the vertical elongated member 315 can translate when it is configured to expand telescopically. The second aperture 335 may be configured to secure an end of the vertical elongated member 315 while allowing it to expand telescopically. In still another alternative embodiment (not shown), the upper coupling 325, regardless of configuration, is an integrated component of the upper elongated member 320.

A lower coupling 340 joins the lower elongated member 310 to the vertical elongated member 315. The lower coupling 340 contains an upper section 345 and a lower section 350. Lower section 350 includes a third aperture 355 that receives the lower elongated member 310 and permits the lower coupling 340 to translate in the Y direction. In other words, lower coupling 340 and lower elongated member 310 are permitted to slide vis-à-vis each other through a range of motion. It should be understood that lubricant or bearings may be utilized to provide for smoother translation in both linkages 325 and 340.

The third aperture 355 and the lower elongated member 310 have rectangular cross sections. The rectangular cross sections help prevent the lower elongated member 310 from rotating about its longitudinal axis (i.e., the Y axis), thus providing a stable measurement platform. In alternative embodiments the third aperture 355 and the lower elongated member 310 have polygonal or non-circular cross sections in order to prevent the lower elongated member 310 from rotating about its longitudinal axis.

The upper section 345 includes a slot configured to receive an end of the vertical elongated member 315. A pin 360 runs through the upper section 345 and the vertical elongated member 315, effectively joining the lower elongated member 310 and the vertical elongated member 315. The lower coupling 340 and pin 360 allow the vertical elongated member 315 to rotate about the pin's longitudinal axis. This permits the vertical elongated member 315 to rotate about an X axis. It should be understood that lubricant or bearings may be utilized to provide for smoother rotation. In alternative embodiments, the pin 360 is replaced by a hinge joint, ball joint, or heim joint, allowing the vertical elongated member 315 to rotate about at least the Z axis.

The pin 360 restricts rotation of the bottom of the vertical elongated member 315 about the Z axis. However, the top of the vertical elongated member 315 is free to rotate about the Z axis, as described above. Therefore, a twisting motion may occur. In an alternative embodiment (not shown), the upper section of the lower coupling may include slots that receive the pin, and allow the bottom of the vertical elongated member to rotate about the Z axis.

An upper receiver 365 receives the upper elongated member 320 through a fourth aperture 370. The fourth aperture 370 permits the upper elongated member 320 to translate forward and rearward relative to the upper receiver 365 in the X direction. In other words, upper elongated member 320 slides through a range of motion with respect to the upper receiver 365. It should be understood that lubricant or bearings may be utilized to provide for smoother translation.

As shown, the fourth aperture 370 and the upper elongated member 320 have square cross sections. The square cross sections help prevent the upper elongated member 320 from rotating about its longitudinal axis. In alternative embodiments the fourth aperture 370 and the upper elongated member 320 have polygonal or non-circular cross sections in order to prevent the upper elongated member 320 from rotating about its longitudinal axis.

In an alternative embodiment, the upper receiver 365 does not allow the upper elongated member 320 to pass through it. In other words, the upper elongated member 320 does not translate through the upper receiver 365 in this particular embodiment. Instead, the upper elongated member 320 is secured to the upper receiver 365. Although the upper elongated member 320 does not translate through the upper receiver 365 in this particular embodiment, the upper elongated member 320 allows movement in the X direction if it is configured to expand telescopically.

An upper connector 380 secures the apparatus 300 to the body of a vehicle. As shown, the upper connector 380 is welded to the body of the vehicle. In this embodiment, the upper connector 380 includes pin 375, which permits the upper receiver 365 to rotate about the pin 375. In other words, the pin permits the upper receiver 365 to rotate relative to the upper connector 380. It should be understood that lubricant or bearings may be utilized to provide for smoother translation. In alternative embodiments, the upper connector 380 is selected from the group consisting of a screw, a joint, a suction cup, glue, tape, and solder.

The measurement apparatus 300 is connected to a wheel (not shown) by a lower connector 305. In one embodiment, lower connector 305 connects the lower elongated member 310 to the wheel while inhibiting the rotation of the lower elongated member 310 about its longitudinal axis. As shown, lower connector 305 is a ring bearing. In alternative embodiments, the lower connector 305 may be a four-point ring bearing, a thrust roller ring bearing, or a multiple row ring bearing.

As shown, the measurement apparatus 300 has the ability to translate in the X and Y directions. Additionally, the measurement apparatus also has the ability to rotate about the X axis at two different locations.

In the above-described embodiment, rotation of the lower elongated member 310 about the Y axis is restricted during steering angle changes, even when the steer axis of the wheel is not normal to the road. Accordingly, if a sensor were mounted to the measurement apparatus 300 in a downward facing position, it would not be rotated about the Y axis out of the downward facing position.

Figure 4:
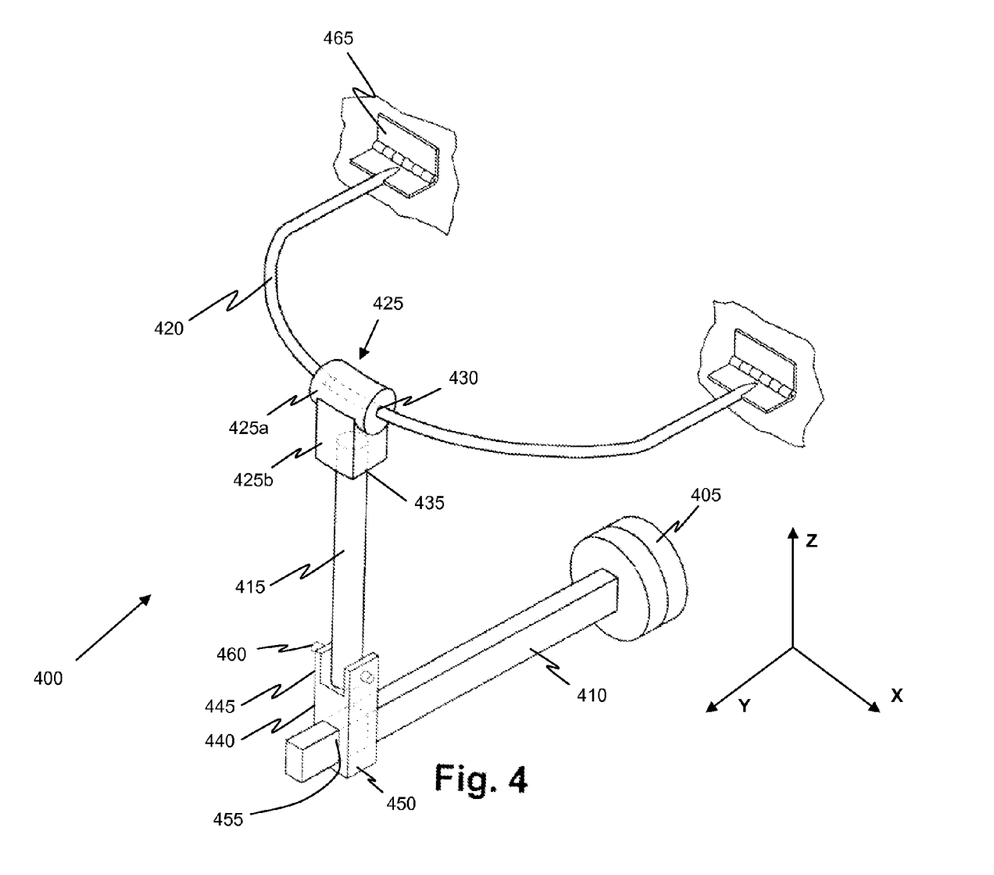
FIG. 4 is a perspective view of another alternative embodiment of a measurement apparatus.

FIG. 4 illustrates a perspective view of another alternative embodiment of a measurement apparatus 400. The measurement apparatus 400 includes a lower elongated member 410, a vertical elongated member 415, and an upper elongated member 420. The lower elongated member 410, and vertical elongated member 415 have longitudinal axes that are generally orthogonal to each other. Here, the lower elongated member 410 extends in the Y direction, the vertical member 415 extends in the Z direction, and the upper elongated member 420 lies in the X-Y plane. Each of the lower elongated member 410, vertical elongated member 415, and upper elongated member 420 may rotate or translate such that they are no longer orthogonal to each other.

The lower elongated member 410, vertical elongated member 415, and upper elongated member 420 all have a fixed length. However, in alternative embodiments, at least one of the lower elongated member 410, vertical elongated member 415, and upper elongated member 420 is configured to expand telescopically.

An upper coupling 425 joins the upper elongated member 420 to the vertical elongated member 415. The upper coupling 425 may translate along upper elongated member 420 by sliding along the upper elongated member 420. The upper coupling 425 is connected to one end of the vertical elongated member 415. In the illustrated embodiment, the upper coupling 425 has an upper section 425a and a lower section 425b that are connected to each other. The upper section 425a may be affixed to the lower section 425b by an adhesive, welding, or by fasteners such as bolts, screws, pegs, or other fasteners. Alternatively, the upper coupling 425 may be a unitary component.

The upper section 425a has a first aperture 430 that allows the upper coupling 425 to translate along the upper elongated member 420. As shown, the upper elongated member 420 has curved and straight segments. The upper elongated member 420 has a circular cross section and the first aperture 430 in the upper section 425a of the upper coupling 425 has a corresponding circular cross section. As shown, no interference fit or press fit exists between upper elongated member 420 and the upper coupling 425. Accordingly, the upper coupling 425 may rotate about the upper elongated member 420 (i.e., about the X axis). It should be understood that lubricant or bearings may be utilized to provide for smoother translation or rotation. In an alternative embodiment (not shown), the upper elongated member has a polygonal cross section and the first aperture 430 of the upper section 425a of the upper coupling 425 has a corresponding polygonal cross section.

The lower section 425b of the upper coupling 425 includes a second aperture 435 that receives the vertical elongated member 415. As shown, the lower section 425b of the upper coupling 425 rests on top of the vertical elongated member 415 and does not allow the vertical elongated member 415 to pass through it. In this embodiment, the vertical elongated member 415 and the second aperture 435 both have circular cross sections. Therefore, the vertical elongated member 415 is free to rotate about its longitudinal axis (i.e., the Z axis), but its ability to translate is limited to the depth of the second aperture 435. It should be understood that lubricant or bearings may be utilized to provide for smoother rotation. In an alternative embodiment, the second aperture 435 permits the vertical elongated member 415 to pass through the upper coupling 425. In another alternative embodiment, the vertical elongated member 415 can translate when it is configured to expand telescopically. The second aperture 435 may be configured to secure an end of the vertical elongated member 415 while allowing it to expand telescopically.

A lower coupling 440 joins the lower elongated member 410 to the vertical elongated member 415. The lower coupling 440 contains an upper section 445 and a lower section 450. Lower section 450 includes a third aperture 455 that receives the lower elongated member 410 and permits the lower coupling 440 to translate in the Y direction. In other words, lower coupling 440 and lower elongated member 410 are permitted to slide vis-à-vis each other through a range of motion. It should be understood that lubricant or bearings may be utilized to provide for smoother translation.

The third aperture 455 and the lower elongated member 410 have rectangular cross sections. The rectangular cross sections help prevent the lower elongated member 410 from rotating about its longitudinal axis, thus providing a stable measurement platform. In alternative embodiments, the third aperture 455 and the lower elongated member 410 have polygonal or non-circular cross sections in order to prevent the lower elongated member 410 from rotating about its longitudinal axis.

The upper section 445 includes a slot configured to receive an end of the vertical elongated member 415. A pin 460 runs through the upper section 445 and the vertical elongated member 415, effectively joining the lower elongated member 410 and the vertical elongated member 415. The lower coupling 440 and pin 460 allow the vertical elongated member 415 to rotate about the pin's longitudinal axis. This permits the vertical elongated member 415 to rotate about the X axis. It should be understood that lubricant or bearings may be utilized to provide for smoother rotation. In alternative embodiments, the pin 460 is replaced by a hinge joint, ball joint, or heim joint, allowing the vertical elongated member 415 to rotate about at least the Z axis.

The pin 460 restricts rotation of the bottom of the vertical elongated member 415 about the Z axis. However, the top of the vertical elongated member 415 is free to rotate about the Z axis, as described above. Therefore, a twisting motion may occur. In an alternative embodiment (not shown), the upper section of the lower coupling may include slots that receive the pin, and allow the bottom of the vertical elongated member to rotate about the Z axis.

An upper connector 465 connects the upper elongated member 420 to the vehicle. In the illustrated embodiment, the upper connector 465 is a pair of hinges that allow the upper elongated member 420 to rotate about the X axis. In alternative embodiments, the upper connector 465 is selected from the group consisting of a screw, a joint, a suction cup, glue, tape, solder, a weld, and combinations thereof. The upper connector 465 may include single or multiple components in alternative embodiments.

The measurement apparatus 400 is connected to wheel (not shown) by a lower connector 405. In one embodiment, lower connector 405 connects the lower elongated member to the wheel while inhibiting the rotation of the lower elongated member about its longitudinal axis. As shown, lower connector 405 is a ring bearing. In alternative embodiments, the lower connector 405 may be a four-point ring bearing, a thrust roller ring bearing, or a multiple row ring bearing.

In the above-described embodiment, rotation of the lower elongated member 410 about the Y axis is restricted during steering angle changes, even when the steer axis of the wheel is not normal to the road. Accordingly, if a sensor were mounted to the measurement apparatus 400 in a downward facing position, it would not be rotated about the Y axis out of the downward facing position.

Figure 5:
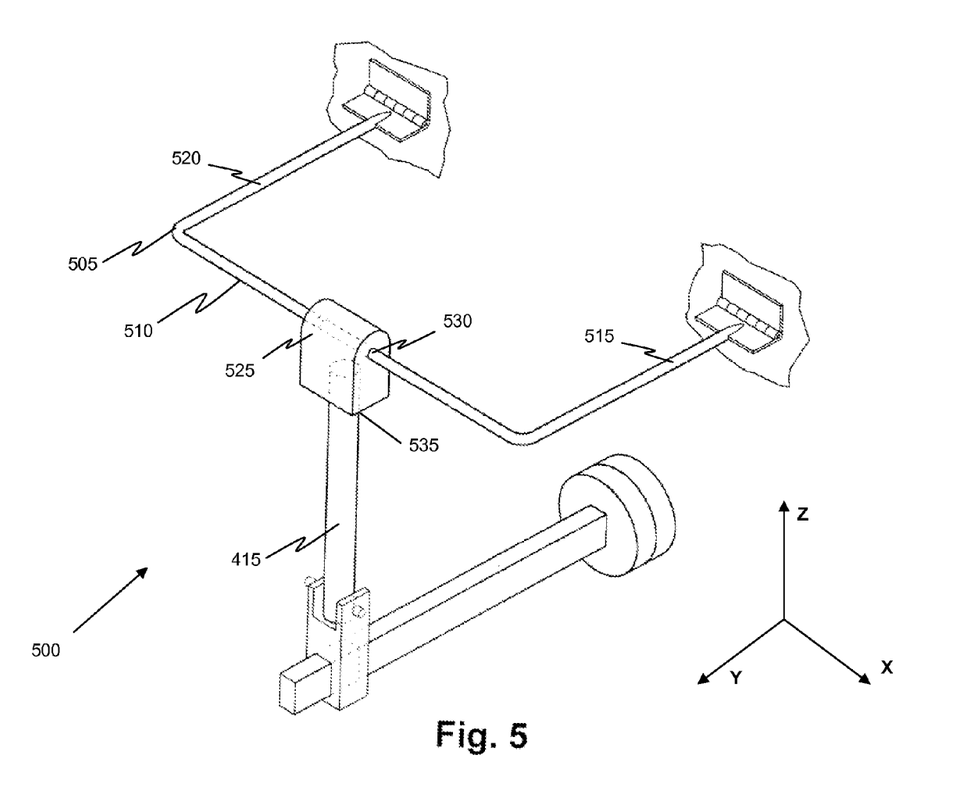
FIG. 5 is a perspective view of yet another alternative embodiment of a measurement apparatus.

FIG. 5 illustrates a perspective view of still another embodiment of a measurement apparatus 500. The measurement apparatus 500 is substantially the same as the measurement apparatus 400 of FIG. 4, except for the differences described herein Like reference numerals are used to indicate like components. It should be understood that the alternative embodiments discussed above regarding the measurement apparatus 400 may also be employed with the measurement apparatus 500.

The measurement apparatus 500 includes an upper elongated member 505 that lies in the X-Y plane and is generally orthogonal to the Z axis. As shown, the upper elongated member 505 is not curved, but instead has three straight segments. The first straight segment 510 extends in the X direction. The second straight segment 515 and third straight segment 520 extend from the ends of the first straight segment 510 in the Y direction towards the vehicle.

An upper coupling 525 joins the upper elongated member 505 to the vertical elongated member 415. The upper coupling 525 is a unitary component. The upper coupling 525 may translate along upper elongated member 520 by sliding along the upper elongated member 520. The upper coupling 425 is connected to one end of the vertical elongated member 415. In an alternative embodiment, the upper coupling 525 may include an upper section and a lower section, like the upper coupling 425 shown in FIG. 4.

The upper coupling 525 is connected to one end of the vertical elongated member 415. In the illustrated embodiment, the upper coupling 525 has a first aperture 530 that allows the upper coupling 525 to translate in the X direction along the first straight segment 510 of upper elongated member 505.

The upper elongated member 505 has a circular cross section and the first aperture 530 in the upper coupling 525 has a corresponding circular cross section. Accordingly, the upper coupling 525 may rotate about the upper elongated member 505 (i.e., about the X axis). It should be understood that lubricant or bearings may be utilized to provide for smoother translation or rotation.

In an alternative embodiment (not shown), the upper elongated member 505 has a polygonal cross section and the first aperture 530 of the upper coupling 525 has a corresponding polygonal cross section. In such an embodiment, upper coupling 525 contains a joint permitting the vertical elongated member 515 to rotate about the X axis.

The upper coupling 525 also includes a second aperture 535 that receives the vertical elongated member 415. As shown, the upper coupling 525 rests on top of the vertical elongated member 415 and does not allow the vertical elongated member 415 to pass through it. In this embodiment, the vertical elongated member 415 and the second aperture 535 both have circular cross sections. Therefore, the vertical elongated member 415 is free to rotate about its longitudinal axis, but its ability to translate is limited to the depth of the second aperture 535. In an alternative embodiment, the second aperture 535 permits the vertical elongated member 415 to pass through the upper coupling. In another alternative embodiment, the vertical elongated member 415 can translate when it is configured to expand telescopically. The second aperture 535 may be configured to secure an end of the vertical elongated member 415 while allowing it to expand telescopically.

In the above-described embodiment, rotation of the lower elongated member 510 about the Y axis is restricted during steering angle changes, even when the steer axis of the wheel is not normal to the road. Accordingly, if a sensor were mounted to the measurement apparatus 500 in a downward facing position, it would not be rotated about the Y axis out of the downward facing position.

In each of the above described embodiments, the components of the measurement apparatus may be sized such that, when the measurement apparatus is mounted to a selected vehicle, the width of the vehicle and the measurement apparatus is less than the width of a standard highway lane. For example, the lower elongated member may be between 0.1 and 0.5 meter in length, the vertical elongated member may be between 0.1 and 1 meter in length, and the upper elongated member may be between 0.1 and 1 meter in length.

To the extent that the term "includes" or "including" is used in the specification or the claims, it is intended to be inclusive in a manner similar to the term "comprising" as that term is interpreted when employed as a transitional word in a claim. Furthermore, to the extent that the term "or" is employed (e.g., A or B) it is intended to mean "A or B or both." When the applicants intend to indicate "only A or B but not both" then the term "only A or B but not both" will be employed. Thus, use of the term "or" herein is the inclusive, and not the exclusive use. See, Bryan A. Garner, A Dictionary of Modern Legal Usage 624 (2d. Ed. 1995). Also, to the extent that the terms "in" or "into" are used in the specification or the claims, it is intended to additionally mean "on" or "onto." Furthermore, to the extent the term "connect" is used in the specification or claims, it is intended to mean not only "directly connected to," but also "indirectly connected to" such as connected through another component or components.

While the present disclosure has been illustrated by the description of embodiments thereof, and while the embodiments have been described in considerable detail, it is not the intention of the applicants to restrict or in any way limit the scope of the appended claims to such detail. Additional advantages and modifications will readily appear to those skilled in the art. Therefore, the disclosure, in its broader aspects, is not limited to the specific details, the representative apparatus and method, and illustrative examples shown and described. Accordingly, departures may be made from such details without departing from the spirit or scope of the applicant's general inventive concept.

What is claimed is:

1. An apparatus for use in measuring camber angle of a wheel on a vehicle, comprising:
    a lower elongated member having a longitudinal axis;
    a vertical elongated member having a longitudinal axis;
    an upper elongated member having a longitudinal axis;
    a lower coupling that connects the lower elongated member to the vertical elongated member, wherein the lower coupling permits the lower elongated member to translate along its longitudinal axis, and wherein the lower coupling permits the vertical elongated member to rotate about at least one axis;
    an upper coupling that connects the vertical elongated member to the upper elongated member, wherein the upper coupling permits the vertical elongated member to rotate about at least one axis;
    a lower connector configured to connect the lower elongated member to the wheel, and;
    an upper connector configured to connect the upper elongated member to the vehicle.

2. The apparatus of claim 1, wherein the upper coupling permits the vertical elongated member to translate along its longitudinal axis.

3. The apparatus of claim 1, further comprising an upper receiver that connects the upper elongated member to the upper connector, wherein the upper receiver permits the upper elongated member to translate along its longitudinal axis.

4. The apparatus of claim 1, wherein the upper coupling is configured to translate along the upper elongated member.

5. The apparatus of claim 1, wherein the lower coupling includes a lower section configured to receive the lower elongated member and an upper section configured to receive a pin.

6. The apparatus of claim 1, wherein the upper connector comprises a hinge.

7. The apparatus of claim 1, wherein the upper connector is selected from the group consisting of a screw, a joint, a suction cup, glue, tape, solder, a magnetic connection, and a weld.

8. The apparatus of claim 1, wherein the lower connector is a ring bearing.

9. The apparatus of claim 1, wherein at least one of the lower elongated member, the vertical elongated member, and the upper elongated member is configured to expand telescopically.

10. An apparatus configured to be mounted to a vehicle for obtaining a camber angle measurement, comprising: a lower elongated member;
    a vertical elongated member;
    an upper elongated member;
    a lower coupling that connects the lower elongated member to the vertical elongated member, wherein the lower coupling allows the vertical elongated member to rotate about an axis, and wherein the lower coupling prevents the lower elongated member from rotating about its longitudinal axis;
    an upper coupling that connects the vertical elongated member to the upper elongated member;
    a lower connector connected to the lower elongated member, and configured to be connected to a wheel of a vehicle; and
    an upper connector connected to the upper elongated member, and configured to be connected to the vehicle.

11. The apparatus of claim 10, wherein the lower elongated member is between 0.1 and 0.5 meter in length, the vertical elongated member is between 0.1 and 1 meter in length, and the upper elongated member is between 0.1 and 1 meter in length.

12. The apparatus of claim 10, further comprising an upper receiver that connects the upper elongated member to the upper connector.

13. The apparatus of claim 12, wherein the upper receiver permits the upper elongated member to translate along its longitudinal axis.

14. The apparatus of claim 10, wherein the lower connector is a four-point ring bearing, a thrust roller ring bearing, or multiple row ring bearing.

15. The apparatus of claim 10, wherein at least one of the lower elongated member, the vertical elongated member, and the upper elongated member is configured to expand telescopically.

16. The apparatus of claim 10, wherein the lower coupling further comprises a hinge joint, ball joint, or heim joint.

17. An apparatus for providing a stable platform for taking a measurement of a vehicle, the apparatus having three substantially orthogonal axes, including an X axis defining an X direction, a Y axis defining a Y direction, and a Z axis defining a Z direction, the apparatus comprising:
- an upper elongated member; a vertical elongated member; a lower elongated member;
- means for accommodating rotation of the vertical elongated member about the X axis;
- means for accommodating translation of the lower elongated member in the Y direction;
- means for accommodating rotation of the vertical elongated member about the Z axis;
- means for securing the apparatus to a body of a vehicle; and
- means for securing the apparatus to a wheel of the vehicle.

18. The apparatus of claim 17, further comprising means for accommodating translation of the upper elongated member in the X direction.

19. The apparatus of claim 17, further comprising means for accommodating translation of the vertical elongated member in the Z direction.

20. The apparatus of claim 17, wherein the means for accommodating rotation of the vertical elongated member about the Z axis is a coupling configured to translate in the X direction.

\* \* \* \* \*